(12) United States Patent
Lai et al.

(10) Patent No.: US 6,792,027 B2
(45) Date of Patent: Sep. 14, 2004

(54) INTEGRATED LASER OSCILLATOR-AMPLIFIER SYSTEM

(76) Inventors: Ming Lai, P.O. Box 10845, Plesanton, CA (US) 94588; Mehrdad Mohebi, 5216 Spoleto Ct., Pleasanton, CA (US) 94588; Zhimin Qu, 5595 Springhouse Dr., Apt. 25, Pleasanton, CA (US) 94588

( * ) Notice: Subject to any disclaimer, the term of this patent is extended or adjusted under 35 U.S.C. 154(b) by 0 days.

(21) Appl. No.: 10/385,961

(22) Filed: Mar. 10, 2003

(65) Prior Publication Data

US 2004/0022280 A1 Feb. 5, 2004

Related U.S. Application Data

(60) Provisional application No. 60/363,945, filed on Mar. 11, 2002.

(51) Int. Cl.[7] .............................. H01S 3/10; H01S 3/13; H01S 3/093; H01S 3/08; H01S 3/082
(52) U.S. Cl. .............................. 372/97; 372/25; 372/30; 372/72; 372/92; 372/99
(58) Field of Search .............................. 372/25, 30, 72, 372/92, 97, 99, 43, 21, 22

(56) References Cited

U.S. PATENT DOCUMENTS

| | | | | |
|---|---|---|---|---|
| 4,328,468 A | * | 5/1982 | Krawczak et al. | 372/97 |
| 5,130,857 A | * | 7/1992 | Gupta et al. | 359/563 |
| 5,130,995 A | * | 7/1992 | Grossman et al. | 372/13 |
| 5,272,713 A | * | 12/1993 | Sobey et al. | 372/69 |
| 5,644,424 A | | 7/1997 | Backus et al. | |
| 5,825,562 A | | 10/1998 | Lai et al. | |
| 5,838,701 A | | 11/1998 | Deutsch et al. | |
| 5,963,363 A | | 10/1999 | Weston et al. | |
| 6,016,324 A | | 1/2000 | Rieger et al. | |
| 6,031,854 A | | 2/2000 | Ming | |
| 6,356,575 B1 | * | 3/2002 | Fukumoto | 372/97 |

* cited by examiner

*Primary Examiner*—Don Wong
*Assistant Examiner*—Armando Rodriguez

(57) ABSTRACT

The present invention contemplates an integrated oscillator-amplifier system for deep UV generation. The system employs a long cavity oscillator to lengthen the pulse build-up time and to control the pulse spectral bandwidth. Meanwhile the system employs a short cavity amplifier to shorten the energy extraction time to produce a single short pulse with good energy extraction efficiency. The system further integrates the oscillator and the amplifier by inserting the amplifier cavity inside the oscillator cavity via a mirror of low reflectivity. As a result, the integrated system has a long build-up time to generate a seed pulse in the long cavity oscillator and has a short energy extraction time to generate a short amplified single pulse in the short cavity. Consequently, the integrated system can accommodate a relatively long pump pulse to produce a single short amplified pulse suitable for deep UV laser generation.

16 Claims, 3 Drawing Sheets

INTEGRATED LASER OSCILLATOR-AMPLIFIER SYSTEM

This application claims the benefit of U.S. provisional application No. 60/363,945, filed on Mar. 11, 2002.

FIELD OF THE INVENTION

The present invention relates to a laser system. In particular, the present invention relates to an integrated oscillator-amplifier laser system that is suitable for deep UV generation.

BACKGROUND OF THE INVENTION

Solid-state laser sources operated at deep UV wavelength around 200 nm are greatly desirable for photo-refractive surgeries. Such a deep UV laser source is expected to be more compact, more reliable, and requires less maintenance compared with excimer laser, which is currently the dominant laser source for photo-refractive surgeries. More importantly, solid-state laser sources can be operated at a much higher repetition rate and with much less energy fluctuation compared with the excimer lasers. Scanning a deep UV laser beam with high repetition rate enables a variety of ablation shapes on a cornea surface and provides a great flexibility for the refractive surgeries. The improved stability in pulse energy from a solid-state UV laser source ensures more accurate and better controllable ablation.

In U.S. Pat. No. 6,031,854 to Lai, a diode pumped cascade laser is proposed for deep UV generation. The second laser employs a short cavity with only a gain medium and a wavelength selection element inside the cavity. When pumped by a laser pulse of 50 ns or shorter, the second laser is gain-switched to produce a pulse of nanosecond duration. This nanosecond laser pulse is then converted to deep UV radiation by a wavelength converter.

In the above approach, a short pump pulse is critical for generating a single short pulse with nanosecond duration and millijole energy. The pulse build-up time is proportional to the laser cavity length and inversely proportional to the net pump pulse energy above the lasing threshold of the cavity. When the pump pulse duration is longer than the build-up time of the laser pulse, a second pulse will appear. This results in smaller energy in the first pulse and thus lowers the conversion efficiency in deep UV generation.

It is well known in the art that a combination of master oscillator-power amplifier system is a common approach to obtain amplified pulses of short duration, in addition to good beam profile and narrow bandwidth. In such a system, the master oscillator is usually a low gain, low power laser to produce a seed pulse of certain specifications. The power amplifier is a high gain, high power laser to amplify the seed pulse to a much higher pulse energy. A number of master oscillator-power amplifier systems are commercially available from, for example, Lambda Physics of Germany and Continuum of Santa Clara, Calif.

The advantage of a master oscillator-power amplifier system is that the oscillator and the amplifier laser cavities can be optimized independently. The system, however, requires two pump sources and two gain media. Also, the system requires additional optics to inject the oscillator seed pulse to the amplifier. As a result, a master oscillator-power amplifier system is usually complicated and expensive.

SUMMARY OF THE INVENTION

The present invention contemplates an integrated oscillator-amplifier system for deep UV generation. The system employs a long cavity oscillator to lengthen the pulse build-up time and to control the pulse spectral bandwidth. Meanwhile the system employs a short cavity amplifier to shorten the energy extraction time to produce a single short pulse with good energy extraction efficiency. The system further integrates the oscillator and the amplifier by inserting the amplifier cavity inside the oscillator cavity via a mirror of low reflectivity. As a result, the integrated system has a long build up time to generate a seed pulse in the long cavity oscillator and has a short energy extraction time to generate a short amplified single pulse in the short cavity. Consequently, the integrated system can accommodate a relatively long pump pulse to produce a single short amplified pulse suitable for deep UV laser generation.

According to the present invention, an integrated laser oscillator-amplifier system comprises:

a laser oscillator having a gain medium and a long resonant cavity, said laser oscillator pre-lases to produce a seed pulse when said gain medium is excited with a pump pulse; and a laser amplifier having said gain medium and a short resonant cavity, said laser amplifier is integrated into said laser oscillator via a mirror with low reflectivity and amplifies said seed pulse to generate a short amplified pulse;

wherein said laser oscillator-amplifier system produces a single amplified laser pulse.

One objective of the present invention is to provide a new and improved laser system for deep UV laser generation.

Another objective of the present invention is to provide a new and improved laser oscillator-amplifier system for generating single pulse of nanosecond duration and millijole energy.

A further objective of the present invention is to provide a new and improved laser oscillator-amplifier system accommodating a pump pulse of approximately 100 ns to generate a single pulse of nanosecond duration.

These and other aspects and advantages of the invention will become more apparent in the following drawings, detailed description and claims.

DETAILED DESCRIPTION

Figure 1:
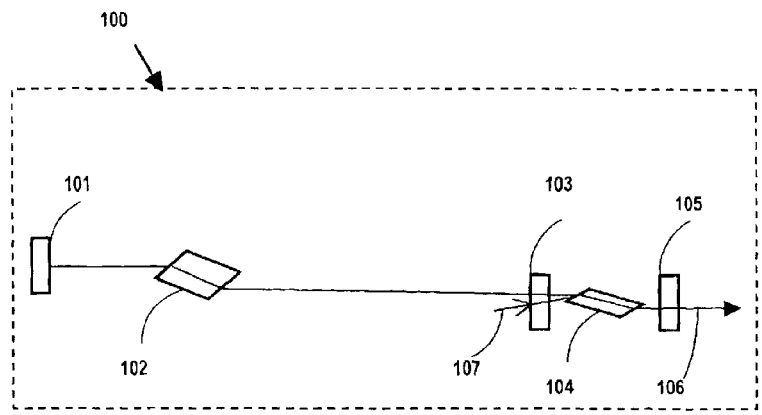
FIG. 1 is a schematic diagram showing a first embodiment of an integrated laser oscillator-amplifier system, in accordance with the present invention.

FIG. 1 is a schematic diagram showing a first embodiment of an integrated laser oscillator-amplifier system 100, in accordance with the present invention. The system 100 consists of a long oscillator cavity formed by mirrors 101 and 105 and a short amplifier cavity formed by mirrors 103 and 105. The system 100 further consists of a common gain medium 104 and a wavelength selection element 102. When excited by a pump pulse beam 107, the system 100 produces an output pulse beam 106.

In this integrated laser oscillator-amplifier system 100, the oscillator has a much longer cavity and a much lower loss than the amplifier. The loss of the amplifier cavity is high because of the reflectivity of mirror 103 is chosen to be low. As it is shown below, when excited by a pump pulse 107, the pulse 106 starts to build-up in the oscillator much earlier while it has a much longer build-up time. The cavity length of the oscillator is chosen such that the pulse 106 is almost fully developed when the gain produced in the gain medium 104 reaches the threshold of the amplifier cavity. The amplifier cavity is chosen such that the energy in the gain medium 104 can be extracted quickly by pulse 106 and thus the pulse 106 reaches a high peak within a short duration. This way the oscillator is there to generate a pre-lased seed pulse while the amplifier is there to amplify the seed pulse to an amplified pulse with a short duration.

During the build-up process of the pulse 106, the wavelength selection element 102 is included in the oscillator cavity. As a result, the seed pulse, i.e. the early stage of pulse 106, has its wavelength and bandwidth controlled by the oscillator. The build-up time of the seed pulse depends on the length, the gain, and the loss of the oscillator cavity. Because the gain and loss of the oscillator cavity are coupled with the amplifier cavity, a simple way to adjust the build-up time of the seed pulse is to change the cavity length of the oscillator.

Figure 2:
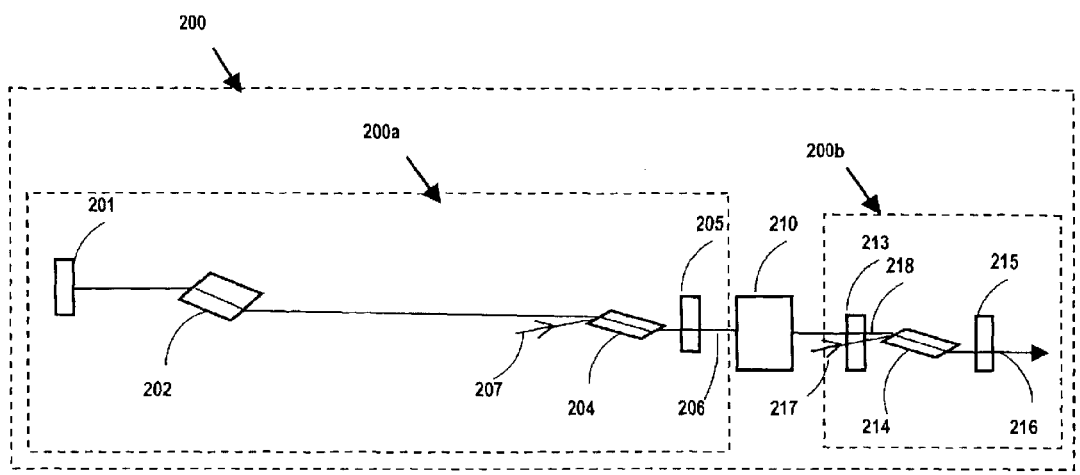
FIG. 2 is a schematic diagram showing a conventional configuration of a master oscillator-power amplifier system with separated laser cavities.

FIG. 2 is a schematic diagram showing a conventional configuration of a master oscillator-power amplifier system 200 with separated laser cavities. The system 200 consists of a master oscillator 200a, a power amplifier 200b, and coupling optics 210. The oscillator 200a is to generate a seed pulse 206 with predetermined parameters. The coupling optics 210 is to couple the seed pulse 206 into the amplifier 200b. The amplifier 200b is to amplify the seed pulse 206 to a pulse 216 with much higher pulse energy.

For comparison purpose, the oscillator 200a and amplifier 200b of system 200 are simply discomposed presentations of system 100. The oscillator 200a consists of a first end mirror 201, a second end mirror 205, a gain medium 204, and a wavelength selection element 202. The first end mirror 201 has a high reflectivity at the laser wavelength. The second end mirror 205 has a certain transmission at the laser wavelength and thus serves as an output coupler. The first end mirror 201 and second end mirror 205 are mirrors with multiple layer dielectric coatings to meet certain specification known to those skilled in the art.

The gain medium 204 is a laser crystal, such as Ti:Sapphire or Cr:LiSAlF. The gain medium 204 has a certain length and doping level such that it produces optimal gain at the laser wavelength when pumped by a pump pulse 207. The gain medium 204 is usually cut at Brewster angle to minimize reflection loss and to define the polarization of the seed laser pulse. Cooling of the gain medium 204 is critical for obtaining constant and stable operation.

The wavelength selection element 202 is to select the laser wavelength and to control the spectral width of the seed laser pulse. A typical wavelength selection element 202 is a single piece or a stack of crystal quartz plates aligned at a Brewster angle of incidence. For a broadband solid state gain medium such as Ti:Sapphire or Cr:LiSAlF, a stack of multiple quartz plates is required to obtain a narrow band spectrum for the seed laser pulse.

The pump laser beam 207 has a shorter wavelength than the laser beam 208. To obtain a good overlap of the pump beam 207 with the laser beam 208 inside the gain medium 204, the pump laser beam 207 shall incident the laser crystal 204 at an angle slightly bigger than the Brewster angle for the laser beam 208. To minimize the reflection loss of the pump beam 207 at the laser crystal 204, the pump laser beam 207 shall have the same polarization as the laser beam 208.

For comparison purpose, oscillator 200a should have a relatively long cavity and thus a long build-up time for seed pulse 206. Besides, the build-up time of seed pulse 206 is also dependent on the transmission of the output coupler 205 and the pump power in the gain medium 204.

On the other hand, the amplifier 200b has a much shorter cavity. The amplifier 200b consists of a first end mirror 213, a second end mirror 215, and a gain medium 214. The amplifier 200b is seeded by seed pulse 206 through coupling optics 210. When pumped by pump pulse 217, the amplifier 200b amplifies seed pulse 206 and produces an amplified pulse 216.

The first end mirror 213 and the second end mirror 215 are also dielectric mirrors. The loss of the amplifier cavity is chosen to be high such that no pulse builds up before the arrival of the seed pulse 206. This way the output pulse 216 from the amplifier 200b is substantially the amplified seed pulse 206.

Similar to pump laser beam 207 for the gain medium 204 in the oscillator 200a, the pump laser beam 217 for the gain medium 214 in the amplifier 200b shall have a certain incident angle and polarization with respect to the cavity laser beam 218. Besides, the first end mirror 213 shall have high transmission to the pump laser beam 217.

The coupling optics 210 may include mirrors, lenses, and an optical isolator. Specifically, mirrors are used to direct the seed pulse 206 into the amplifier 200b. Lenses are used to make the seed pulse 206 match the cavity mode of the amplifier 200b. Optical isolator is used to prevent the radiation from the amplifier 200b to interfere with the operation of the oscillator 200a. Commercially available design software may be used to assist the design of the oscillator 200a and amplifier 200b for given parameters.

Figure 3:
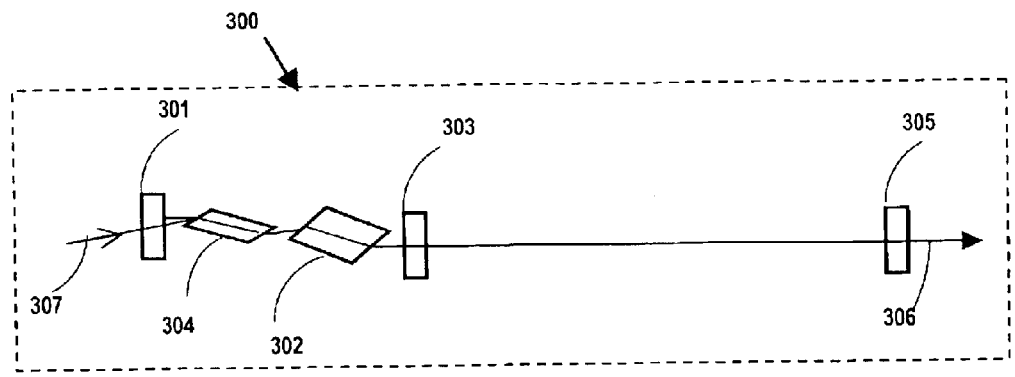
FIG. 3 is a schematic diagram showing a second embodiment of an integrated laser oscillator-amplifier system, in accordance with the present invention.

FIG. 3 is a schematic diagram showing a second embodiment of an integrated laser oscillator-amplifier system 300, in accordance with the present invention. In this integrated laser oscillator-amplifier system 300, the long cavity oscillator is formed by a first end mirror 301 and a second end mirror 305, and the amplifier short cavity is formed by a first end mirror 301 and a second end mirror 303. The oscillator consists of the first end mirror 301, a gain medium 304, a wavelength selection element 302, and the second end mirror 305. The amplifier consists of the first end mirror 301, the gain medium 304, and the second end mirror 303. When pumped by a pulsed pump laser beam 307, the system 300 produces a pulsed output laser beam 306.

Similar to the oscillator-amplifier system 100, the oscillator in the system 300 has a low lasing threshold and starts to pre-lase early to provide a seed pulse for later amplification by the amplifier. The seed pulse thus has its wavelength and bandwidth controlled by the wavelength selection element 302 and has its build-up time controlled by cavity length of the oscillator.

The amplifier in the system 300 has a high lasing threshold due to a low reflectivity of the second end mirror 303.

The amplifier has a short depletion time due to its short cavity length. This way the amplifier can boost the seed pulse to generate output pulse 306.

Figure 4:
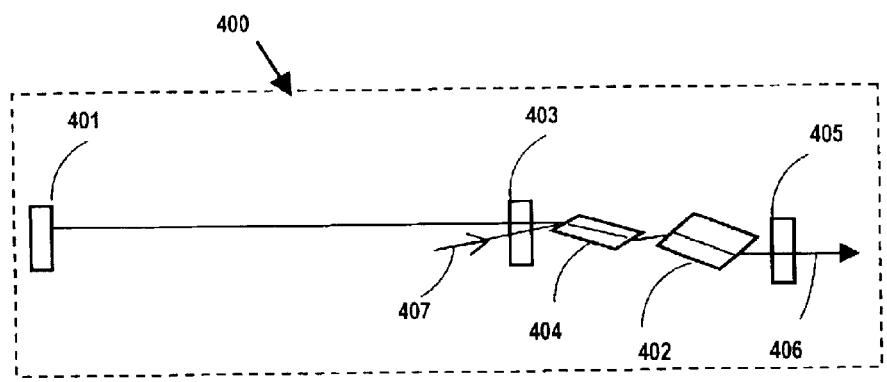
FIG. 4 is a schematic diagram showing a third embodiment of an integrated laser oscillator-amplifier system, in accordance with the present invention.

FIG. 4 is a schematic diagram showing a third embodiment of an integrated laser oscillator-amplifier system 400 in accordance with the present invention. In this integrated laser oscillator-amplifier system 400, the long cavity oscillator is formed by a first end mirror 401 and a second end mirror 405, and the short cavity amplifier is formed by a first end mirror 403 and a second end mirror 405. The oscillator consists of the first end mirror 401, a gain medium 404, a wavelength selection element 402, and the second end mirror 405. The amplifier consists of the first end mirror 403, the gain medium 404, and the second end mirror 405. When pumped by a pulsed pump laser beam 407, the system 400 produces a pulsed output laser beam 406.

Similar to the oscillator-amplifier system 100, the oscillator in the system 400 has a low lasing threshold and starts to pre-lase early to provide, a seed pulse for later amplification by the amplifier. The seed pulse thus has its wavelength and bandwidth controlled by the wavelength selection element 402 and has its build-up time controlled by the cavity length of the oscillator.

The amplifier in the system 400 has a high lasing threshold due to a low reflectivity of the second end mirror 403. The amplifier has a short depletion time due to its short cavity length. This way the amplifier can boost the seed pulse to generate output pulse 406.

In one embodiment, the integrated laser oscillator-amplifier system takes the configuration of FIG. 4. The gain medium 404 is a Ti:Sapphire laser crystal, and the pump laser beam 407 is delivered from a Q-switched, frequency doubled Nd:YLF laser having pulse duration of about 100 ns and pulse energy of about 5 mJ. The oscillator cavity length is about 30 cm and the amplifier cavity length is about 10 cm. The first end mirror 403 of the amplifier has a transmission of about 60% at the laser wavelength, and the second end mirror 405 of the amplifier has a transmission of about 50%. The wavelength selection element 402 is a stack of three quartz plates. Single pulse operation is expected to produce output pulse 406 with pulse energy about 1 mJ, pulse duration shorter than 10 ns, and a spectral bandwidth narrower than 0.1 nm.

Figure 5:
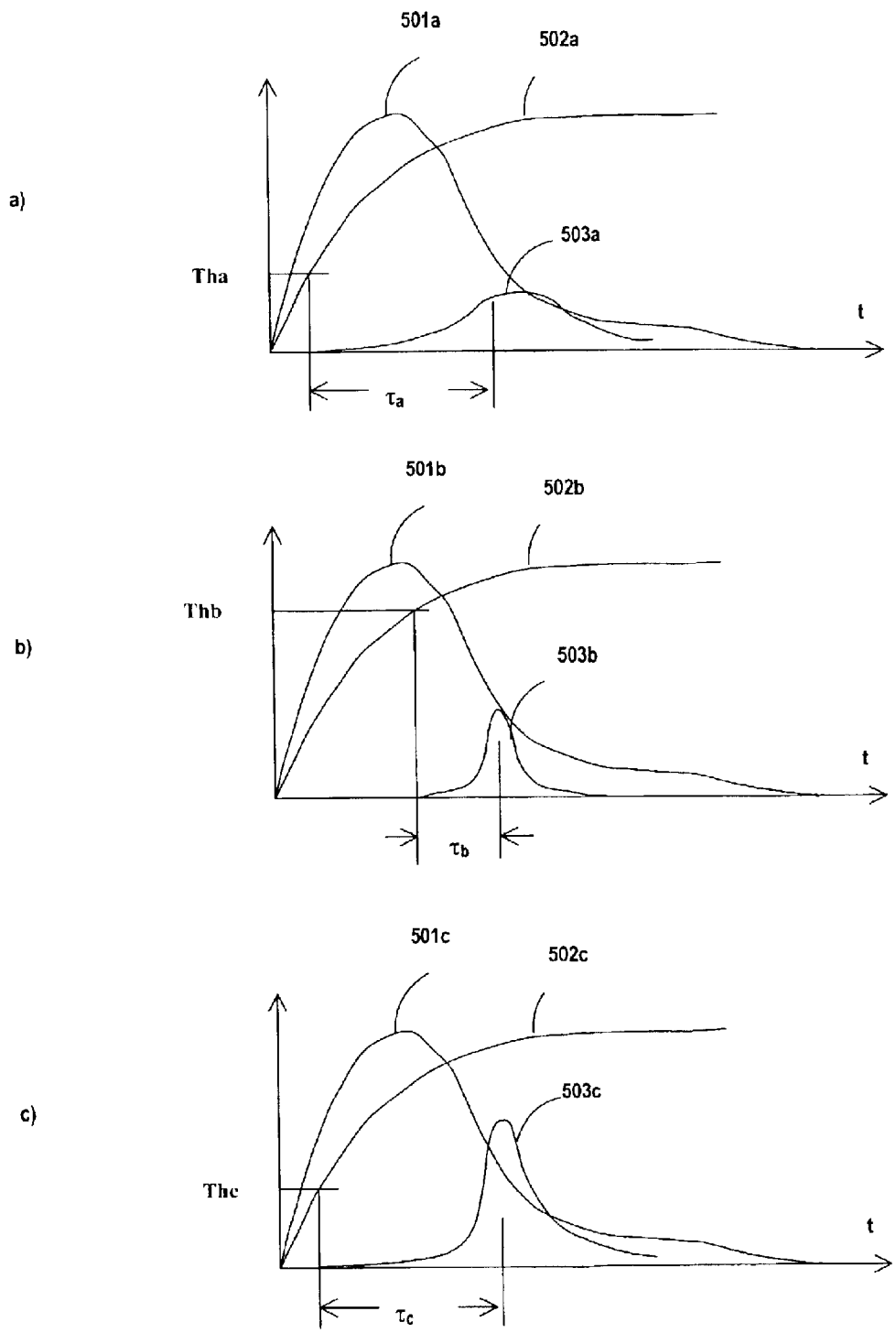
FIG. 5a is a schematic diagram showing the curves of the pump pulse profile, gain, and laser pulse profile of a master oscillator.
FIG. 5b is a schematic diagram showing the curves of the pump pulse profile, gain, and laser pulse profile of a power amplifier without seeding.
FIG. 5c is a schematic diagram showing the curves of the pump pulse profile, gain, and laser pulse profile of an integrated laser oscillator-amplifier system of the present invention.

FIG. 5a is a schematic diagram showing the temporal evolution of the pump pulse intensity profile 50la, gain profile 502a, and laser pulse intensity profile 503a of a master oscillator 200a. The pump pulse profile 501a shows a typical temporal profile of a pump pulse 207 delivered from a Q-switched, frequency doubled Nd:YLF laser. The gain profile 502a shows an estimated gain curve generated in the gain medium 204 excited by the pump pulse 207. The laser pulse profile 503a shows an expected laser seed pulse 206 from the oscillator 200a. Because of low cavity loss and long cavity length, the master oscillator 200a has a relatively low lasing threshold Tha and a relatively long building up time $\tau_a$ Consequently the master oscillator 200a has also a long energy depletion time. As a result, the master oscillator 200a produces a seed pulse 206 having a pulse profile of 503a, which is a long pulse.

FIG. 5b is a schematic diagram showing the temporal evolution of the pump pulse intensity profile 501b, gain profile 502b, and laser pulse intensity profile 503b of a power amplifier 200b. For comparison purpose, the pump pulse 217 for the power amplifier 200b is delivered from the same Q-switched, frequency doubled Nd:YLF laser as in FIG. 5a. The pump pulse profile 501b is thus similar to that of the pump pulse profile 501a. The gain profile 502b shows an estimated gain curve generated in the gain medium 214 excited by the pump pulse 217. The laser pulse profile 503b shows an expected laser pulse 216 from the power amplifier 200b. Because of high cavity loss and short cavity length, the power amplifier 200b has a relatively high lasing threshold Thb and a relatively short building up time $\tau_b$. Consequently the amplifier 200b has also a short energy depletion time. As a result, the power amplifier 200b produces an amplified pulse 216 having a pulse profile of 503b, which is a short pulse.

As shown in FIG. 5b, the power amplifier 200b is designed such that the seed pulse 206 arrives when the amplifier gain 502b reaches approximately to its maximum and before a pulse starts to build up inside the amplifier cavity. This way, the power amplifier 200b amplifies the seed pulse 206 instead of producing its own pulse.

FIG. 5c is a schematic diagram showing the temporal evolution of the pump pulse intensity profile 501c, gain profile 502c, and laser pulse intensity profile 503c of an integrated laser oscillator-amplifier system 400 of the present invention. For comparison purpose, the pump pulse 407 to the integrated system 400 is delivered from the same Q-switched, frequency doubled Nd:YLF laser as in FIG. 5a. The pump pulse profile 501c is thus similar to that of the pump pulse profile 501a. The gain profile 502c shows an estimated gain curve generated in the gain medium 404 excited by the pump pulse 407. The laser pulse profile 503c shows an expected laser pulse 406 from the integrated system 400. Because of low cavity loss and long cavity length for the oscillator, the integrated system 400 has a relatively low lasing threshold Thc and a relatively long building up time $\tau_c$. Meanwhile, because of high cavity loss and short cavity length for the amplifier, the integrated system 400 has a relatively short energy depletion time. As a result, the integrated system 400 produces a pulse 406 having a pulse profile of 503c, which is a relatively short pulse.

As shown in FIG. 5c, the integration system 400 is designed such that the seed pulse is generated when the gain 502c reaches approximately to its maximum and onsets the amplifier. This way, the integrated system 400 produces a pulse 406 having a pulse profile 503c similar to that of an amplified pulse 216 from a conventional master oscillator-power amplifier system 200.

The integrated laser oscillator-amplifier system 100, 300, or 400 significantly simplifies the structure of a master oscillator-power amplifier system 200. By adjusting the oscillator cavity length, the amplifier cavity length, and the transmission of an end mirror 103, 303, or 403 of the amplifier, the integrated system 100, 300, or 400 can be optimized to produce short single pulse for relatively long pump pulse 107, 307, or 407.

The above figures and descriptions are intended for illustrating the present invention. It is understood that various modifications can be made without departing from the scopes of the invention as defined in the appended claims.

REFERENCES

U.S. Patent Documents

U.S. Pat. No. 5,644,424 Backus et al. Jul. 1, 1997 Laser amplifier and method
U.S. Pat. No. 5,825,562 Lai et al. Oct. 20, 1998 Method of continuous motion for prolong usage of optical elements under the irradiation of intensive laser beams
U.S. Pat. No. 5,838,701 Deutsch et al. Nov. 17, 1998 Q-switched solid-state laser U.S. Pat. No. 5,963,363,Weston et al. Oct. 5, 1999 System and method for amplifying an optical pulse and pumping laser therefor U.S. Pat. No. 6,016,324 Rieger et al. Jan. 18, 2000 Short pulse laser system U.S. Pat. No. 6,031,854 Lai Feb. 29, 2000 Diode-pumped cascade laser for deep UV generation

What is claimed is:

1. An integrated laser oscillator-amplifier system comprising:
   a laser oscillator having a gain medium and a long resonant cavity, wherein said long resonant cavity is formed by a first mirror and a second mirror, and wherein said gain medium is located inside said long resonant cavity;
   a laser amplifier having said gain medium and a short resonant cavity of 10 cm or shorter, wherein said short resonant cavity is formed by said first mirror and a third mirror, and wherein said third mirror has low reflectivity and is inserted between said gain medium and said second mirror; and
   a pump laser pulse having a predetermined pulse duration of approximate 100 ns and a pulse energy of about 3 to 10 mJ, wherein said pump laser pulse impinges and excites said gain medium to produce a transient gain profile;
   wherein said laser oscillator pre-lases to produce a seed laser pulse and said laser oscillator-amplifier system produces a single amplified laser pulse with pulse duration shorter than 10 ns.

2. An integrated laser oscillator-amplifier system as in claim 1 wherein said gain medium is a laser crystal of Ti:Sapphire or Cr:LiSAlF.

3. An integrated laser oscillator-amplifier system as in claim 1 wherein said laser oscillator further comprising:
   a wavelength selection element having a narrow bandwidth to control the wavelength and bandwidth of said seed pulse.

4. An integrated laser oscillator-amplifier system as in claim 3 wherein said wavelength selection element is made of one or more quartz plates.

5. An integrated laser oscillator-amplifier system as in claim 1 wherein said laser oscillator has a cavity length of about 30 cm.

6. An integrated laser oscillator-amplifier system as in claim 1 wherein said pump laser pulse has a pulse energy of about 5 mJ.

7. An integrated laser oscillator-amplifier system as in claim 1 wherein said pump laser pulse is delivered from a Q-switched, frequency doubled Nd:YLF laser.

8. An integrated laser oscillator-amplifier system as in claim 1 wherein said third mirror has a reflectivity of about 60%.

9. An integrated laser oscillator-amplifier system as in claim 1 wherein said gain medium is cut for Brewster angle of incidence to control the polarization of said seed pulse.

10. A method for producing an integrated laser oscillator-amplifier system, comprising the steps of:
    providing a laser oscillator having a gain medium and a long resonant cavity, wherein said long resonant cavity is formed by a first mirror and a second mirror and said gain medium is a laser crystal disposed inside said long resonant cavity, and wherein said long resonant cavity has a lower cavity loss and a longer pulse build-up time,
    constructing a laser amplifier inside said laser oscillator by inserting into said oscillator cavity a third mirror with a low reflectivity, wherein said laser amplifier has a short resonant cavity around said gain medium and said short resonant cavity has a length of 10 cm or shorter and has a higher cavity loss and a shorter pulse build-up time;
    providing a pulsed pump laser beam with pulse duration of about 100 ns and pulse energy of about 3 to 10 mJ; and
    directing said pump laser beam to excite said gain medium to produce optical gain for both said laser oscillator and said laser amplifier, wherein said optical gain has a transient gain profile and said laser oscillator produces a seed pulse;
    wherein said integrated laser oscillator-amplifier system produces a single, amplified pulse carrying substantially the wavelength, beam quality, and spectral bandwidth defined by said laser oscillator while having pulse duration of 10 ns or shorter as characterized by said laser amplifier.

11. A method as in claim 10, further comprising the steps of:
    providing a wavelength selection element disposed inside said oscillator cavity;
    wherein said seed pulse has a predetermined wavelength and spectrum bandwidth.

12. An integrated laser oscillator-amplifier system comprising:
    a gain medium of solid state crystal;
    a pump laser pulse impinging and exciting said gain medium to provide optical gain, wherein said pump laser pulse has a predetermined pulse duration of about 100 ns and pulse energy of about 3 to 10 mJ;
    a wavelength selection element aligned optically with said gain medium;
    a first resonant cavity formed by a first mirror and a second mirror, enclosing said gain medium and said wavelength selection element, and having a long cavity length, wherein said first resonant cavity pre-lase to produce a seed pulse with predetermined wavelength, beam profile, and spectrum bandwidth; and
    a second resonant cavity formed by said first mirror and a third mirror, enclosing at least said gain medium, and having a shorter cavity length and a higher laser threshold than said first resonant cavity, wherein said second resonant cavity is aligned optically with said first resonant cavity to amplify and shorten said seed pulse into an amplified pulse;
    wherein said laser oscillator-amplifier system produces a single, amplified laser pulse of nanosecond duration.

13. An integrated laser oscillator amplifier system as in claim 12 wherein said gain medium is a laser crystal of Ti:Sapphire or Cr:LiSAlF.

14. An integrated laser oscillator-amplifier system as in claim 12 wherein said wavelength selection element is made of one or more quartz plates.

15. An integrated laser oscillator-amplifier system as in claim 12 wherein said first resonant cavity has a cavity length of about 30 cm.

16. An integrated laser oscillator-amplifier system as in claim 12 wherein said pump laser pulse has a pulse energy of about 5 mJ.

* * * * *